(12) United States Patent
Ahn et al.

(10) Patent No.: US 6,186,885 B1
(45) Date of Patent: Feb. 13, 2001

(54) INTEGRATED HVAC SYSTEM FOR AN AUTOMOTIVE VEHICLE

(75) Inventors: Kenneth K. Ahn, Trenton; Mark A. Richardson, Midland, both of MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/252,948

(22) Filed: Feb. 18, 1999

(51) Int. Cl.$^7$ ................................ B60S 1/54; B60S 1/58
(52) U.S. Cl. ............... 454/121; 454/156; 237/12.3 R; 237/46
(58) Field of Search .................... 454/156, 121; 237/12.3 R, 46

(56) References Cited

U.S. PATENT DOCUMENTS

| | | | |
|---|---|---|---|
| 5,358,300 | * 10/1994 | Gray | 296/192 |
| 5,687,790 | * 11/1997 | Trame et al. | 165/42 |
| 5,706,170 | * 1/1998 | Glovatsky et al. | 361/695 |
| 5,712,764 | * 1/1998 | Baker et al. | 361/690 |
| 5,927,380 | * 7/1999 | Scoccia | . |
| 5,934,361 | * 8/1999 | Parisi et al. | 165/43 |
| 5,934,988 | * 8/1999 | Fischer | 454/156 |

* cited by examiner

*Primary Examiner*—Denise L. Ferensic
*Assistant Examiner*—Michelle A. Mattera

(57) ABSTRACT

An integrated HVAC system for an automotive vehicle, including mating forward and rearward shells each have mating portions of left and right duct arms for delivering conditioned air therethrough. The mating shells define a central enclosure within which a drop-in heater core module may be operatively placed.

1 Claim, 7 Drawing Sheets

INTEGRATED HVAC SYSTEM FOR AN AUTOMOTIVE VEHICLE

BACKGROUND OF THE INVENTION

1. Field of the Invention

The present invention relates generally to heating, ventilation, and air conditioning (HVAC) systems for automotive vehicles, and more particularly to an integrated, modular HVAC system for automotive vehicles.

2. Disclosure Information

FIG. 1 shows a typical HVAC system, steering column support assembly, and cross-car beam as presently used in most automotive vehicles. Those familiar with such currently known systems will realize that these systems involve a multiplicity of individual (and sometimes redundant) parts that must be assembled together, which makes such approaches expensive, difficult to assemble, and so forth.

It would be desirable, therefore, to provide a single system for an automotive vehicle which provides the functions served by the individual HVAC, steering column support, and cross-car beam systems while simplifying and improving upon the prior art designs.

SUMMARY OF THE INVENTION

The present invention overcomes the disadvantages of the prior art approaches by providing an integrated HVAC system for an automotive vehicle, including mating forward and rearward shells each have mating portions of left and right duct arms for delivering conditioned air therethrough. The mating shells define a central enclosure within which a drop-in heater core module may be operatively placed.

It is an object and advantage that the HVAC system of the present invention provides a generic forward/rearward shell structure which can fit into a wide variety of cars, with a drop-in heater core module that can be custom-designed to accommodate specific car models. Thus, customization for any given car can be accomplished by designing a special drop-in heater core module for that car and installing such module into the generic forward/rearward shell.

Another advantage is that the integrated HVAC system of the present invention is non-handed; that is, it may be used on either left-hand drive or right-hand drive vehicles.

These and other advantages, features and objects of the invention will become apparent from the drawings, detailed description and claims which follow.

DETAILED DESCRIPTION OF THE PREFERRED EMBODIMENTS

Figure 1:
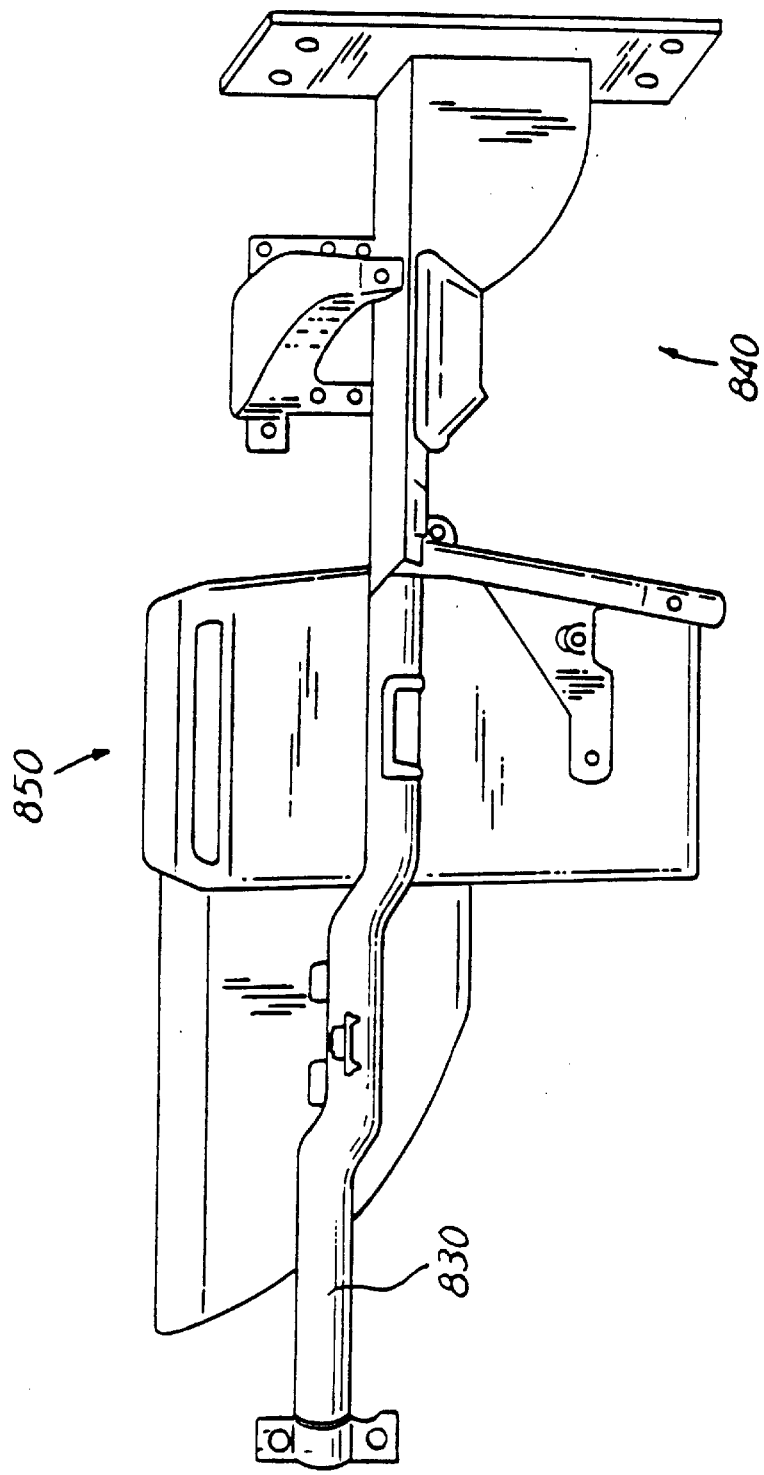
FIG. 1 is a front view of an HVAC/cross-car beam/steering column support system according to the prior art.
Figure 2:
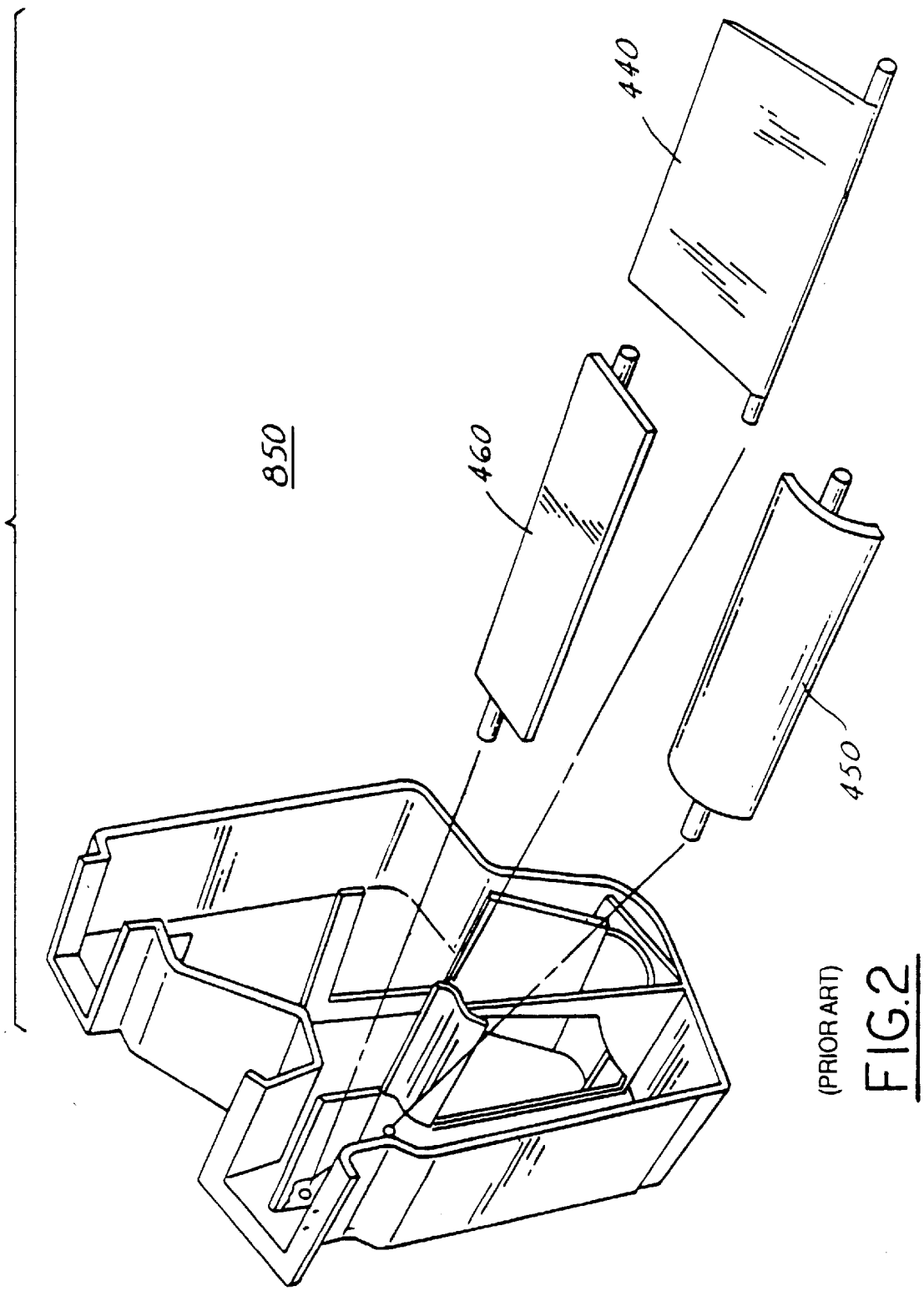
FIG. 2 is a perspective sectioned view of a portion of an HVAC system according to the prior art.

Referring now to the drawings, FIGS. 2–7 show an integrated HVAC system for an automotive vehicle. (Note that forward and rearward directions and left and right transverse outboard directions are defined graphically in FIG. 2, to assist in referencing the various elements of the HVAC system). The integrated HVAC system comprises mating plastic-molded forward and rearward shells each having mating portions of left and right duct arms for delivering conditioned air therethrough into the passenger compartment of the vehicle. The mating shells define a central enclosure within which a drop-in heater core module may be operatively placed.

To assist the reader in understanding the present invention, all reference numbers used herein are summarized in the table below, along with the elements they represent:

100=Rearward shell
110=Rearward enclosure
112=Forward-facing opening in rearward enclosure
114=Floor outlet
116=Bottom wall
118=Rearward wall
120=Left channel
121=U-shaped cross-section of left channel
122=First transverse portion
124=First left distal end of first transverse portion
126=Second rearward-extending portion
130=Right channel
132=Third transverse portion
134 First right distal end of third transverse portion
136=Fourth rearward-extending portion
200=Forward shell
210=Forward enclosure
212=Rearward-facing opening in forward enclosure
213=Blower inlet
214=Top wall
215=Forward wall
216=Defroster outlet
217=Sealing flange
220=Left elongate vertical wall
222=Fifth transverse portion
224=Second left distal end of fifth transverse portion
226=Sixth rearward-extending portion
230=Right elongate vertical wall
232=Seventh transverse portion
234=Second right distal end of seventh transverse portion
236=Eighth rearward-extending portion
300=Central enclosure
315=Central interior volume
320=Left duct
325=Left interior volume
330=Right duct
335=Right interior volume
400=Heater core module
410=Module enclosure
411=Top wall of module enclosure
412=Bottom wall of module enclosure
413=Forward wall of module enclosure
414=Rearward wall of module enclosure
415=Left wall of module enclosure 416=Right wall of module enclosure
420=Inlet port of module enclosure
430=Outlet port of module enclosure
440=Blend door
450=Mode door
460=Defroster door
470=Heater core
500=Evaporator core
600=Integrated (one-piece) steering column support
700=Control panel (for mode, temperature, fan speed)
810=Defroster nozzle
820=Blower
830=Cross-car beam (prior art)
840=Steering column support assembly (prior art)
850=HVAC system (prior art)

The rearward shell 100 comprises: (1) a rearward enclosure 110 generally having the shape of a 5-sided box with a forward-facing opening 112 defined therein, the rearward enclosure further including a floor outlet 114 defined in a bottom or rearward wall 116/118 thereof; (2) a generally L-shaped, elongate left channel 120 having a generally U-shaped cross-section, the left channel comprising a first transverse portion 122 extending outward and leftward from the rearward enclosure, wherein the first transverse portion transitions at a first left distal end 124 thereof into a second rearward-extending portion 126; and (3) a generally L-shaped, elongate right channel 130 having a generally U-shaped cross-section, the right channel comprising a third transverse portion 132 extending outward and rightward from the rearward enclosure, wherein the third transverse portion transitions at a first right distal end 134 thereof into a fourth rearward-extending portion 136. The left and right channels 120/130 are arranged such that their generally U-shaped cross-sections are open toward the front of the vehicle for the first and third transverse portions 122/132, and open toward the left and right outboard directions respectively for the second and fourth rearward-extending portions 126/136.

The forward shell 200 comprises: (1) a forward enclosure 210 generally having the shape of a 5-sided box with a rearward-facing opening 212 defined therein, the forward enclosure further including a blower inlet 213 defined in a top or forward wall 214/215 thereof, a defroster outlet 216 defined in the top wall 214, and an evaporator core 500 operatively disposed within the forward enclosure; (2) a generally L-shaped, elongate left vertical wall 220 comprising a fifth transverse portion 222 extending outward and leftward from the forward enclosure, wherein the fifth transverse portion transitions at a second left distal end 224 thereof into a sixth rearward-extending portion 226; and (3) a generally L-shaped, elongate right vertical wall 230 comprising a seventh transverse portion 232 extending outward and rightward from the forward enclosure, wherein the seventh transverse portion transitions at a second right distal end 234 thereof into an eighth rearward-extending portion 236.

Figure 3:
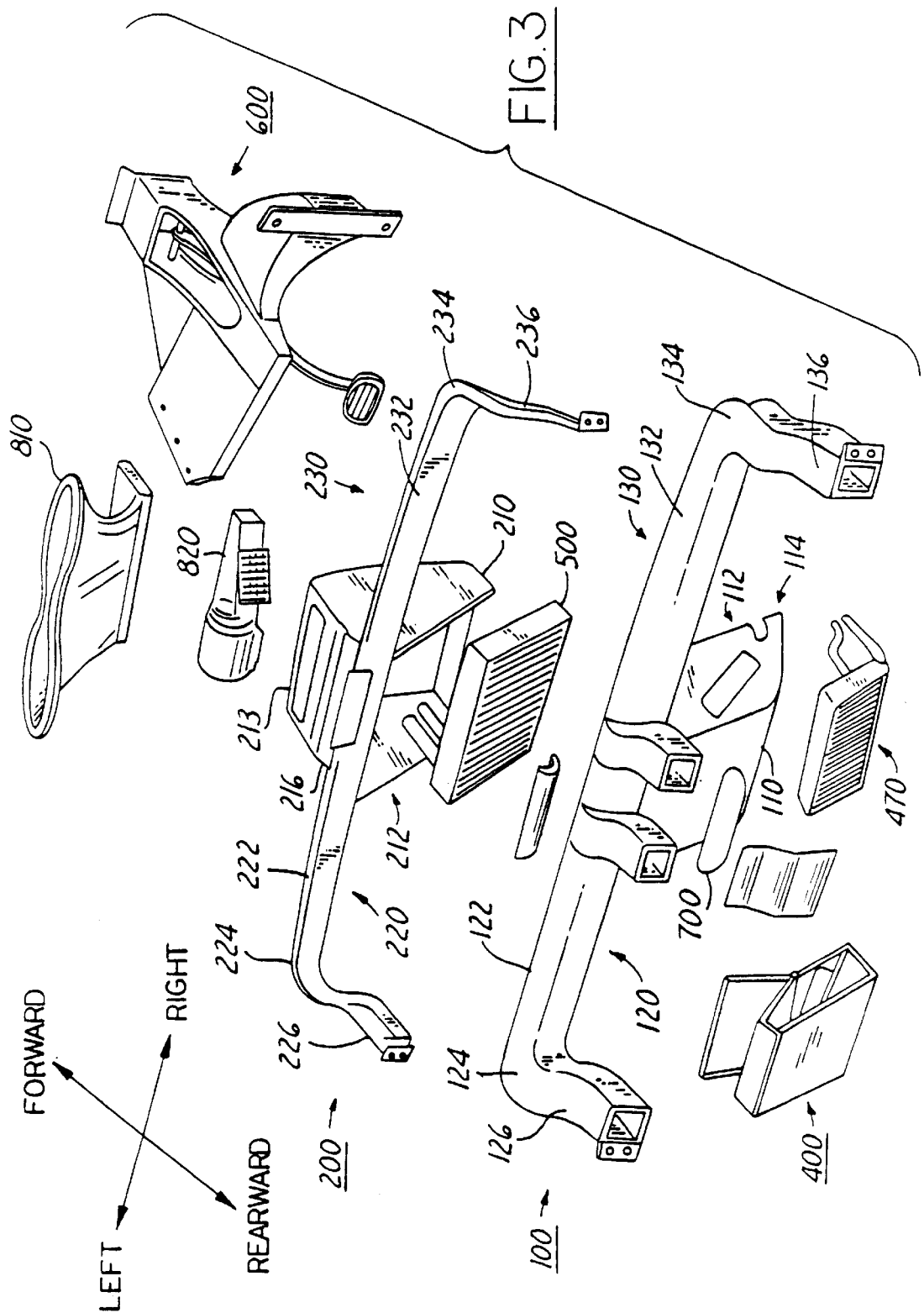
FIGS. 3–4 are exploded perspective and exploded side sectional views, respectively, of an integrated HVAC system according to the present invention.
Figure 4:
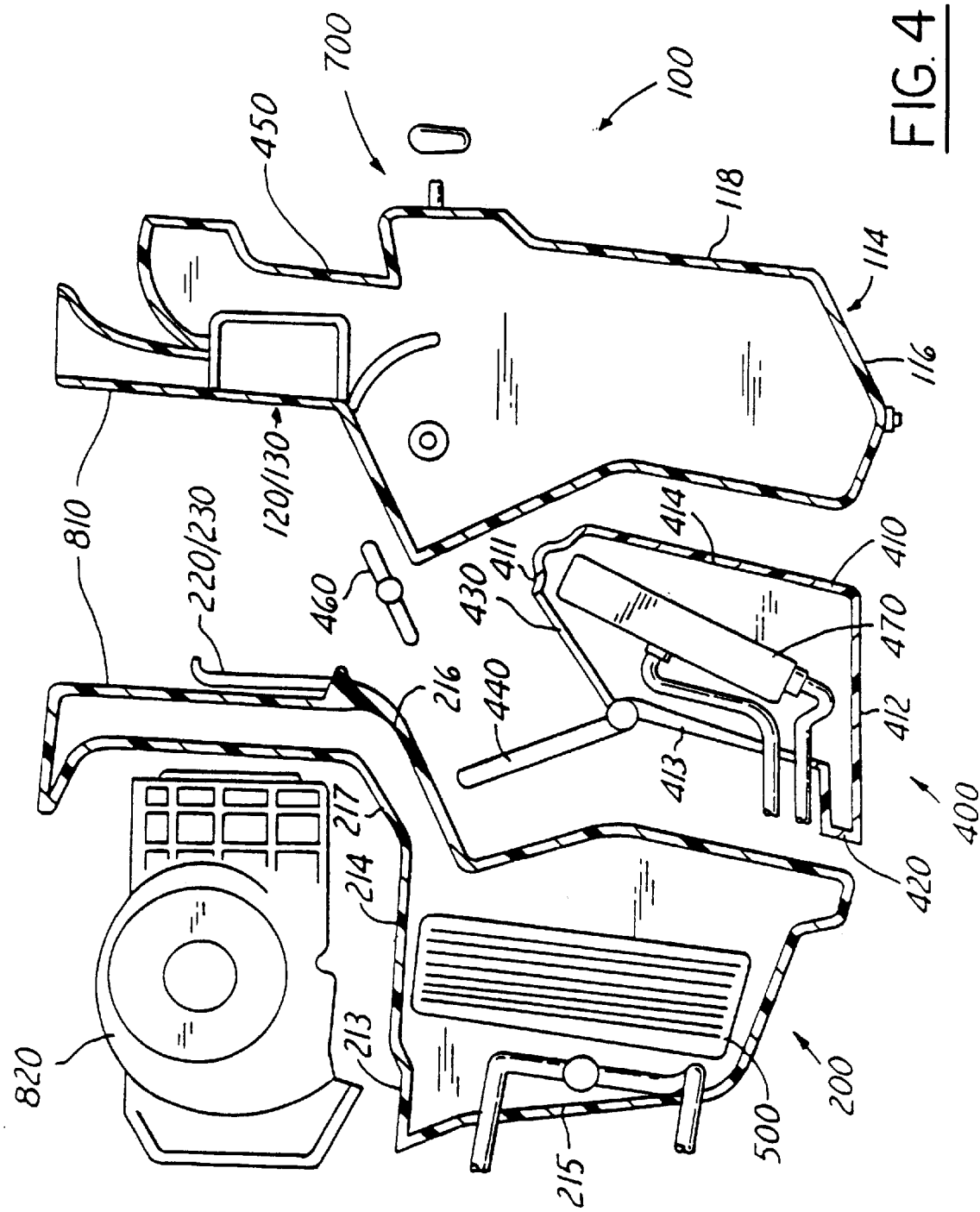
Figure 5:
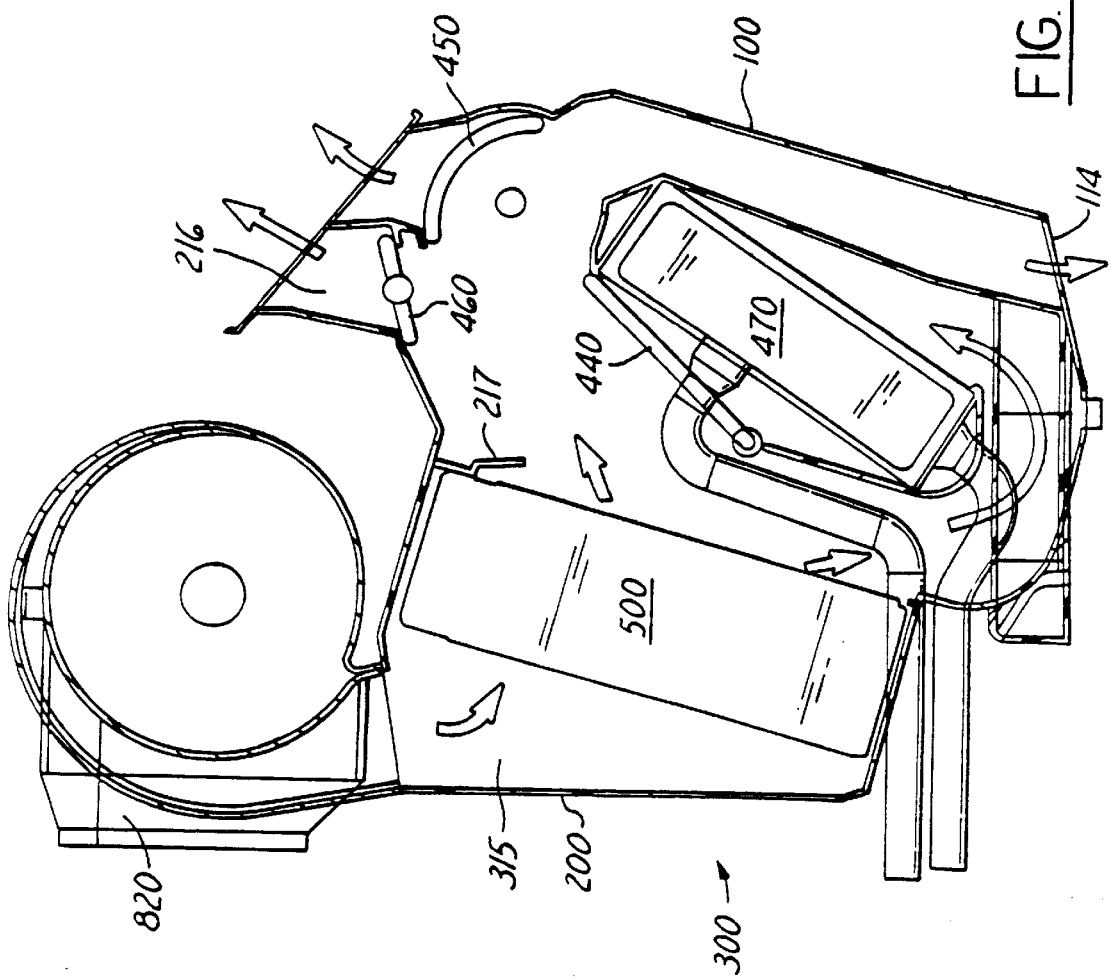
FIG. 5 is an assembled side sectional view of the HVAC system shown in FIG. 4
Figure 6:
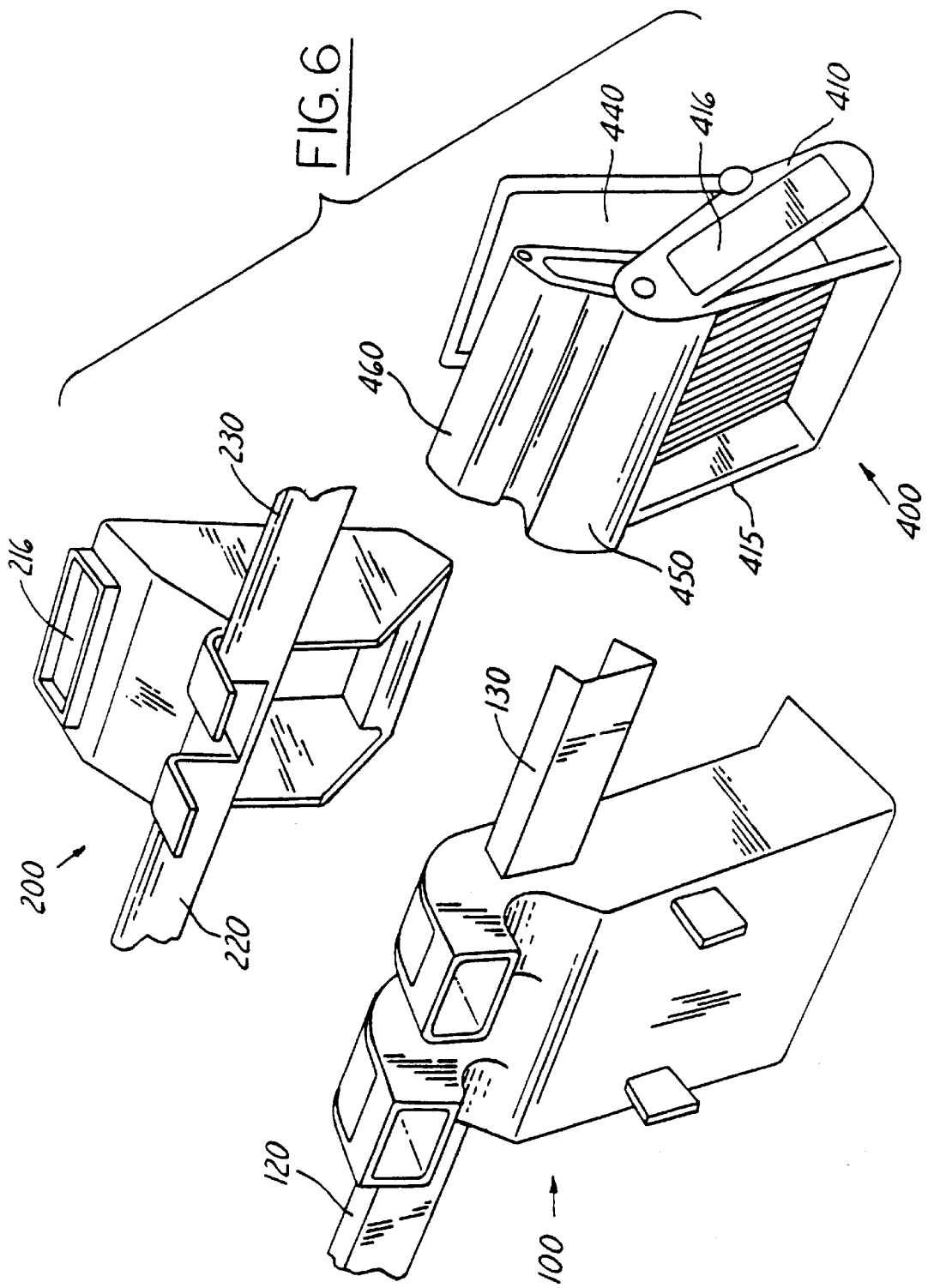
FIG. 6 is an exploded, perspective, partial view of an integrated HVAC system according to a preferred embodiment of the present invention.
Figure 7:
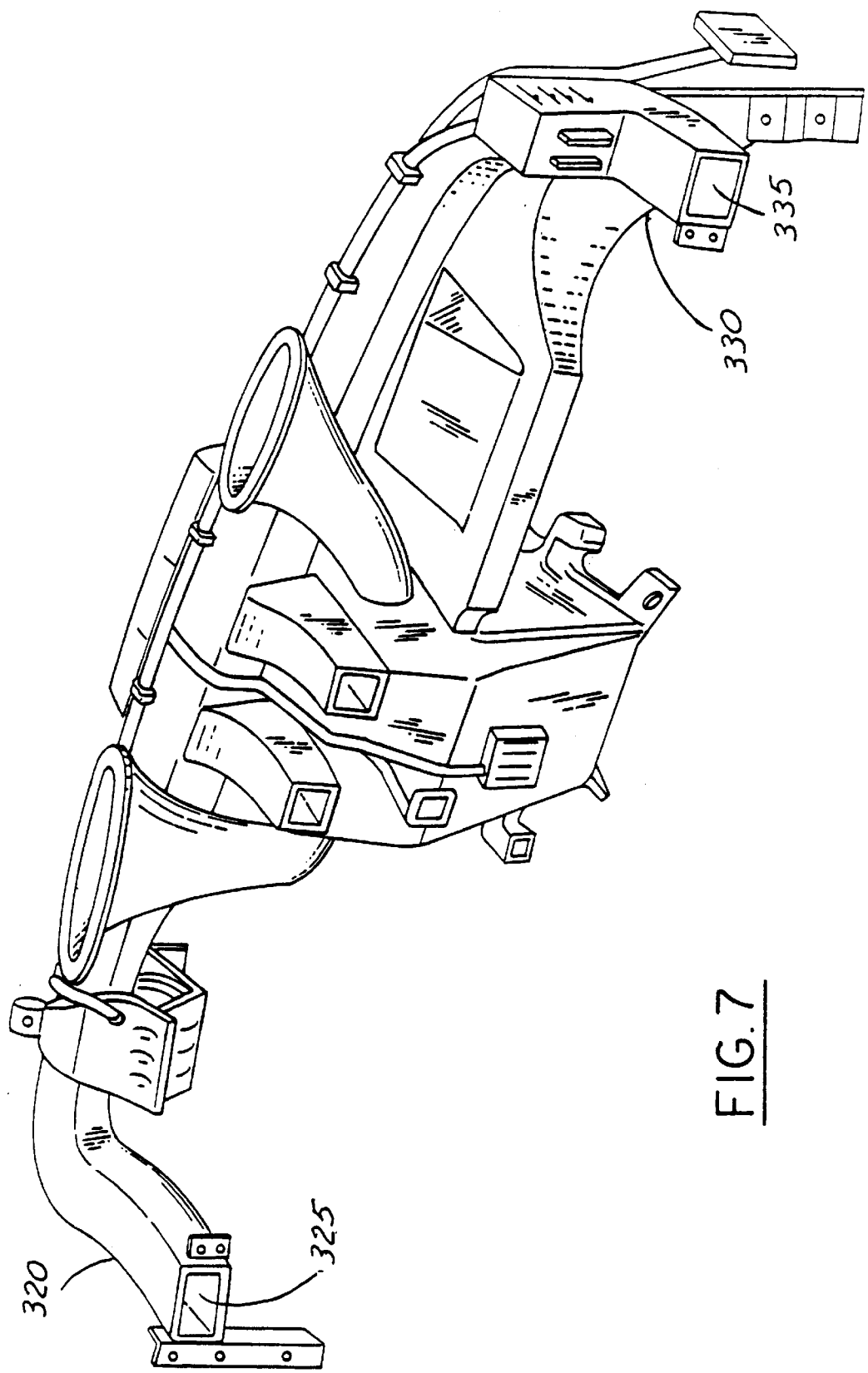
FIG. 7 is a perspective, assembled view of the HVAC system according to the present invention.

As illustrated in FIGS. 3 and 7, the forward and rearward shells 200/100 are molded so as to be matingly and removably attached together, such that: (1) the forward and rearward enclosures 210/220 form a central enclosure 300 having a central interior volume 315 therewithin; (2) the left channel 120 and the left vertical wall 220 form a left duct 320 having a left interior volume 325 therewithin in fluid communication with the central interior volume 315; and (3) the right channel 130 and the right vertical wall 230 form a right duct 330 having a right interior volume 335 therewithin in fluid communication with the central interior volume 315.

As mentioned above, the integrated HVAC system is non-handed; that is, it may be used on either left-hand drive or right-hand drive vehicles. The only left- or right-handedness occurs in the placement of the one-piece steering column assembly 600; for example, the assembly 600 may be attached on the right-hand side of the HVAC central enclosure for most European and Asian (i.e., right-hand drive) cars. By integrating all the previously existing components, the assembly 600 may be molded as one piece, preferably out of magnesium or other suitable materials.

In most vehicles, the passenger-side cross-car beam 830 supports only the airbag, any wiring that is attached thereto, and sometimes perhaps a small amount of the instrument panel weight. (Incidentally, the cross-car beam is not intended to stiffen or rigidize the body/frame of the vehicle.) The integrated system of the present invention eliminates the need for a separate cross-car beam by providing an integral passenger-side duct which serves the same function as the cross-car beam.

Various other modifications to the present invention may occur to those skilled in the art to which the present invention pertains. For example, it may be desirable to mold troughs and retaining features into the left/right ducts for routing/retaining any adjacent electrical wiring. Also, the defroster outlet may be molded completely into the rearward shell, or completely into the forward shell, or split between the forward and rearward shells. Other modifications not explicitly mentioned herein are also possible and within the scope of the present invention. It is the following claims, including all equivalents, which define the scope of the present invention.

What is claimed is:

1. An integrated HVAC system for an automotive vehicle having forward and rearward directions and left and right transverse outboard directions, said system comprising:
    a) a molded rearward shell comprising:
        (1) a rearward enclosure generally having the shape of a 5-sided box with a forward-facing opening defined therein, said rearward enclosure further including a floor outlet defined in a bottom or rearward wall thereof;
        (2) a generally L-shaped, elongate left channel having a generally U-shaped cross-section, said left channel comprising a first transverse portion extending outward and leftward from said rearward enclosure, wherein said first transverse portion transitions at a first left distal end thereof into a second rearward-extending portion;
        (3) a generally L-shaped, elongate right channel having a generally U-shaped cross-section, said right channel comprising a third transverse portion extending outward and rightward from said rearward enclosure, wherein said third transverse portion transitions at a first right distal end thereof into a fourth rearward-extending portion;
        (4) wherein said generally U-shaped cross-sections of said left and right channels are open toward the front of the vehicle for said first and third transverse portions, and open toward the left and right outboard directions respectively for said second and fourth rearward-extending portions; and
    (b) a molded forward shell comprising:
        (1) a forward enclosure generally having the shape of a 5-sided box with a rearward-facing opening defined therein, said forward enclosure further including a blower inlet defined in a top wall thereof, a defroster outlet defined in said top wall thereof, and an evaporator core operatively disposed within said forward enclosure;

(2) a generally L-shaped, elongate left vertical wall comprising a fifth transverse portion extending outward and leftward from said forward enclosure, wherein said fifth transverse portion transitions at a second left distal end thereof into a sixth rearward-extending portion;

(3) a generally L-shaped, elongate right vertical wall comprising a seventh transverse portion extending outward and rightward from said forward enclosure, wherein said seventh transverse portion transitions at a second right distal end thereof into an eighth rearward-extending portion;

(c) said forward and rearward shells being matingly and removably attached together, such that:

(1) said forward and rearward enclosures form a central enclosure having a central interior volume therewithin;

(2) said left channel and said left vertical wall form a left duct having a left interior volume therewithin in fluid communication with said central interior volume;

(3) said right channel and said right vertical wall form a right duct having a right interior volume therewithin in fluid communication with said central interior volume.

* * * * *

UNITED STATES PATENT AND TRADEMARK OFFICE
Certificate

Patent No. 6,186,885                          Patented: February 13, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kenneth K. Ahn, Mark A. Richardson and Daniel Vander Sluis.

Signed and Sealed this Fourteenth Day of August, 2001.

HENRY A. BENNETT
*Supervisory Patent Examiner*
Technology Center 3700